Patented Dec. 5, 1939

2,182,175

UNITED STATES PATENT OFFICE 2,182,175

METHOD OF PREPARATION OF LEGUMINOUS FOODSTUFFS

Rupert G. Gates, Sharon, Mass., assignor of one-half to Charles L. Wickersham, Sharpsburg, Pa.

No Drawing. Application March 27, 1937.
Serial No. 133,421

4 Claims. (Cl. 99—98)

This invention relates to edible leguminous products, and especially to edible products prepared from soya beans as the principal and essential constituent.

It has long been known that many of the numerous species of soya beans have a very high content of glycinine, lecithin and other useful proteins, vitamins, etc., as well as digestible fats and minerals desirable in the human diet. Because of these and other characteristics which make the soya bean a substantially complete food in itself, it has been thought that this bean should form the basis of a desirable pre-cooked food of the cereal or breakfast food type. Efforts to prepare such a product from the soya bean have been unsuccessful, however, largely because of the difficulty in obtaining a product sufficiently palatable for the public taste. An object of my invention is to produce a palatable, pre-cooked, or ready-to-serve type of human food having the soya bean as its principal ingredient. Another object is to provide a satisfactory process for producing such a food. Further objects and advantages of my invention will become apparent from the following description.

I have found that a highly palatable food can be prepared in various finished forms from soya beans by a simple and economical procedure, in accordance with my invention. Any of several species of this legume may be employed as the starting material, but I generally prefer the yellow varieties to the darker colored types, and I find that the species with higher protein contents generally are more desirable than species with lower protein contents. Mixtures of several suitable species may be employed, if desired.

As the first step in the preparation of my improved soya bean food, I generally prefer to decorticate or hull the beans. This step is not necessarily essential, but usually improves the appearance and palatability of the product. The hulled beans are next crushed and ground to flour. Since the preferred varieties of beans usually contain twenty per cent or more of fats, it is sometimes desirable to reduce the fat content somewhat before completing the preparation of the food. I have found that this may be accomplished by known extraction or so-called expelling processes applied before or after crushing or grinding, without adversely affecting the value of the product for its intended use as a palatable, highly nutritious food. The "whole bean" flour or partially extracted flour is then blown with steam to eliminate aldehydes and other unpalatable constituents, when necessary.

I have found that in order to prepare satisfactory flakes and other desirable finished forms of breakfast foods and the like from soya beans, it is necessary to employ with the bean flour an edible adhesive material. The amount of this adhesive required depends upon the fat content and fineness of the soya bean flour, and upon the characteristics of the adhesive foodstuff selected in any particular instance, and on the form and permanence desired in the flake or other final product. This amount is readily determined by trial, and seldom exceeds a few per cent of the weight of the soya bean flour. Adhesives which I have found suitable include dextrin, corn syrup, molasses, tapioca, and the like, and in some instances flours with high starch content. The selected adhesive is preferably mixed with the soya flour and sufficient water to produce a dough having a moisture content of about twenty per cent to thirty-five per cent. Salt, sugar, or other flavoring ingredients or extracts may be added to the dough if desired. The dough is then mixed, preferably in a mechanical dough mixer, to a uniform consistency.

The dough containing the desired flavoring and adhesive material is then cooked, preferably by indirect steam in a jacketed vessel at a pressure not exceeding 25 pounds per square inch. This cooking should be continued for a period of one-half hour to two hours or more, in accordance with the consistency of the dough and the amount of cooking or conversion desired. The cooking vessel is preferably closed, but may be opened from time to time to permit the discharge of vapors which eliminate any further traces of unpalatable constituents in the material. The cooked dough may then be cut into thin slices and dried or allowed to dry to a moisture content of about 15 to 25 per cent. The cooked and partially dried material is then passed through a chopper or other suitable device for preparing nodules or pellets of a size suitable for rolling into flakes, or for other treatment to produce the final product. If desired, a pellet machine or the like may be employed in place of the chopper and/or cooker to produce pellets of controlled size, and the slicing step may then be omitted.

When the product is desired in the form of a flake, the pellets or nodules of partially dried dough are brought to a moisture content of 15 to 20 per cent and then rolled in known manner, to produce thin flakes of the desired size. These flakes are then toasted, and if desired may be toasted under conditions which cause them to puff or expand. The resulting product is a crisp, palatable flake of light brown color. As an alternative to producing a flaked form of food, the nodules or pellets may be toasted with or without puffing to form a breakfast food of the crumble or puffed crumble type.

As an example of one method of preparing my improved soya bean food in accordance with the present invention, a mixture of water and flavoring material (in this instance molasses) was made up in the proportions of about 1 part molasses to 4 parts water. Twelve parts of soya bean flour, prepared as described hereinabove, were then mixed with 1 part or less of dry dextrine, and this dry mixture was added to the liquid mixture with one-fourth part of salt, and mixed in thoroughly. In some instances, a small amount of vanilla was also included. The dough was then put in a steam-jacketed pressure cooker and cooked for one hour at 15 pounds steam pressure. The resulting loaf of cooked dough was then cut into thin slices and allowed to dry by standing overnight. The slices were then put through a chopper to produce nodules, which were seasoned to 15 to 20 per cent moisture and then rolled into flakes and browned in a rotary toaster. The resulting product constituted a delicious breakfast food.

While my invention has been described hereinabove with special reference to certain embodiments and practices which are now considered preferable, it is to be understood that it is not limited to these specific embodiments and practices, except as required by the appended claims.

I claim:

1. The method of producing a palatable precooked food product from soya beans, which comprises grinding soya beans to produce soya bean flour, steaming the flour to remove unpalatable constituents therefrom, mixing the steamed flour with water and minor amounts of edible adhesive and flavoring materials to form a dough, cooking the dough without completely dehydrating it, forming the cooked dough into pieces of the desired size and shape, and toasting said pieces.

2. The method of claim 1, wherein the adhesive mixed with the soya bean flour is selected from the class consisting of dextrin, corn syrup, molasses and tapioca.

3. The method of claim 1, wherein the dough is cooked in a jacketed vessel for a period from one-half to two hours with enclosed steam at a pressure not exceeding 25 pounds per square inch.

4. The method of claim 1, wherein the cooked dough is formed into pellets, and the pellets are rolled into flakes and toasted.

RUPERT G. GATES.